(12) United States Patent
Lee

(10) Patent No.: US 10,854,195 B2
(45) Date of Patent: Dec. 1, 2020

(54) DIALOGUE PROCESSING APPARATUS, A VEHICLE HAVING SAME, AND A DIALOGUE PROCESSING METHOD

(71) Applicants: HYUNDAI MOTOR COMPANY, Seoul (KR); KIA MOTORS CORPORATION, Seoul (KR)

(72) Inventor: Kyung Chul Lee, Seongnam-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 183 days.

(21) Appl. No.: 15/633,544

(22) Filed: Jun. 26, 2017

(65) Prior Publication Data

US 2018/0182382 A1 Jun. 28, 2018

(30) Foreign Application Priority Data

Dec. 26, 2016 (KR) .......................... 10-2016-0178935

(51) Int. Cl.
| | |
|---|---|
| *G10L 21/00* | (2013.01) |
| *G10L 25/00* | (2013.01) |
| *G10L 15/22* | (2006.01) |
| *G10L 25/78* | (2013.01) |
| *G06F 40/30* | (2020.01) |
| *G06F 40/35* | (2020.01) |

(52) U.S. Cl.
CPC .............. *G10L 15/22* (2013.01); *G06F 40/30* (2020.01); *G06F 40/35* (2020.01); *G10L 25/78* (2013.01); *G10L 2025/786* (2013.01)

(58) Field of Classification Search
CPC ... G10L 15/22; G10L 15/30; G10L 2015/223; G10L 25/51
See application file for complete search history.

(56) References Cited

U.S. PATENT DOCUMENTS

| | | | |
|---|---|---|---|
| 9,085,303 B2* | 7/2015 | Wolverton | ............. B60K 35/00 |
| 9,697,822 B1* | 7/2017 | Naik | ..................... G10L 15/063 |
| 2004/0193420 A1* | 9/2004 | Kennewick | ......... G06F 16/3329 |
| | | | 704/257 |
| 2007/0016419 A1* | 1/2007 | Lee | ......................... G10L 15/26 |
| | | | 704/250 |

(Continued)

*Primary Examiner* — Olujimi A Adesanya
(74) *Attorney, Agent, or Firm* — Lempia Summerfield Katz LLC

(57) ABSTRACT

A dialogue processing apparatus and method monitor an intensity of an acoustic signal that is input in real time and determine that speech recognition has started, when the intensity of the input acoustic signal is equal to or greater than a reference value, allowing a user to start speech recognition by an utterance without an additional trigger. A vehicle can include the apparatus and method. The apparatus includes: a monitor to compare an input signal level with a reference level in real time and to determine that speech is input when the input signal level is greater than the reference level; a speech recognizer to output a text utterance by performing speech recognition on the input signal when it is determined that the speech is input; a natural language processor to extract a domain and a keyword based on the utterance; and a dialogue manager to determine whether a previous context is maintained based on the domain and the keyword.

24 Claims, 9 Drawing Sheets

(56) References Cited

U.S. PATENT DOCUMENTS

| | | | |
|---|---|---|---|
| 2007/0198268 A1* | 8/2007 | Hennecke | G10L 15/22 704/270 |
| 2012/0197634 A1* | 8/2012 | Ishikawa | G10L 21/057 704/201 |
| 2014/0040748 A1* | 2/2014 | Lemay | G06F 3/167 715/728 |
| 2014/0114665 A1* | 4/2014 | Murgia | G10L 21/0216 704/275 |
| 2014/0195252 A1* | 7/2014 | Gruber | G10L 15/22 704/275 |
| 2014/0222436 A1* | 8/2014 | Binder | G06F 3/167 704/275 |
| 2015/0134340 A1* | 5/2015 | Blaisch | G06F 16/95 704/275 |
| 2015/0379987 A1* | 12/2015 | Panainte | H04R 1/08 704/246 |
| 2016/0259775 A1* | 9/2016 | Gelfenbeyn | G06F 17/279 |
| 2017/0083285 A1* | 3/2017 | Meyers | G10L 15/00 |
| 2018/0336892 A1* | 11/2018 | Kim | G10L 15/08 |

\* cited by examiner

DIALOGUE PROCESSING APPARATUS, A VEHICLE HAVING SAME, AND A DIALOGUE PROCESSING METHOD

CROSS-REFERENCE TO RELATED APPLICATION(S)

This application claims priority to and the benefit of Korean Patent Application No. 10-2016-0178935, filed on Dec. 26, 2016 in the Korean Intellectual Property Office, the entire contents of which are incorporated herein by reference.

BACKGROUND

1. Field

Embodiments of the present disclosure relate to a dialogue processing apparatus, a vehicle having a dialogue processing apparatus, and a dialogue processing method.

2. Description of Related Art

As technologies for vehicles are developed, various functions for user convenience have been provided in addition to the driving function, which is a basic function of the vehicle.

As the functions performed by the vehicle become variable, the user operation load has increased. The increase of the user operation load has reduced the concentration of the user during vehicle operation, thereby interfering with safe driving. In addition, a user who is unfamiliar with the operation of the vehicle cannot properly utilize the functions performed by the vehicle.

SUMMARY

It is an aspect of the present disclosure to provide a dialogue processing apparatus that can monitor an intensity of an acoustic signal that is input in real time and that can determine that speech recognition has started and that the intensity of the input acoustic signal is equal to or greater than a reference value. The disclosed dialogue processing apparatus allows a user to start speech recognition by an utterance without performing an operation for an additional trigger.

It is another aspect of the present disclosure to provide a dialogue processing apparatus that is capable of providing a response and service appropriate for a user's intention by determining whether a dialogue is continuously performed or whether a dialogue with a new subject has started. In this aspect, the determining is based on a domain and a keyword extracted from an input speech.

The present disclosure is also directed to a dialogue processing method and to a vehicle, each having the dialogue processing apparatuses as described above. Additional aspects of the present disclosure are set forth, in part, in the detailed description below and, in part, will be apparent to those of ordinary skill in the art from the description, or may be learned by practice of the present disclosure.

In accordance with one aspect of the present disclosure, a dialogue processing apparatus includes a monitor configured to compare a level of an input signal with a reference level in real time, and configured to determine that a user's speech is input when the level of the input signal is greater than the reference level. The dialogue processing apparatus also includes a speech recognizer configured to output an utterance in the form of text by performing speech recognition on the input signal when it is determined that the user's speech is input. The dialogue processing apparatus further includes a natural language processor configured to extract a domain and a keyword based on the utterance and includes a dialogue manager configured to determine whether a previous context is maintained based on the domain and the keyword.

In one embodiment, the reference level is determined based on a level of a background signal that is input in a state in which a user's speech is not uttered.

In one embodiment, the dialogue processing apparatus further includes a storage device configured to store the level of the background signal. In this embodiment, the storage device determines that the input signal is the background signal when the level of the input signal is equal to or less than the reference level. The storage device in this embodiment also updates the stored level of the background signal using the level of the input signal.

In one embodiment, the dialogue manager determines whether a previous context that is started is present based on information related to a pre-stored previous context. When the previous context that is started is present, the dialogue manager may determine whether the previous context that is started is ended. When a predetermined reference time is expired from when the previous context is started, the dialogue manager may determine that the previous context is ended. When the reference is not expired, the dialogue manager may determine whether a context is changed by comparing information related to the previous context with information related to a current context.

In one embodiment, the dialogue manager determines whether the context is changed by comparing a domain and a keyword extracted from the previous context with a domain and a keyword extracted from the current context. When it is determined that the context is not changed, the dialogue manager may provide a dialogue and service having a continuity with a previous dialogue and service performed in the previous context. When it is determined that the context is changed, the dialogue manager may end the previous context and start the current context as a new context.

In accordance with another aspect of the present disclosure, a vehicle includes a microphone configured to receive a sound by always being opened, and configured to convert the input sound into an electrical input signal. The vehicle also includes a monitor configured to compare a level of the input signal with a reference level in real time, and configured to determine that a user's speech is input when the level of the input signal is greater than the reference level. The vehicle further includes a speech recognizer configured to output an utterance in the form of text by performing speech recognition on the input signal when it is determined that the user's speech is input. The vehicle also includes a natural language processor configured to extract a domain and a keyword based on the utterance, and includes a dialogue manager configured to determine whether a previous context is maintained based on the domain and the keyword.

In one embodiment, the reference level is determined based on a level of a background signal that is input in a state in which a user's speech is not uttered.

In one embodiment, the vehicle further includes a storage device configured to store the level of the background signal. In this embodiment, the storage device determines that the input signal is the background signal when the level of the input signal is equal to or less than the reference level. The storage device in this embodiment also updates the stored level of the background signal using the level of the input signal.

In one embodiment, the dialogue manager determines whether a previous context that is started is present based on information related to a pre-stored previous context.

When the previous context that is started is present, the dialogue manager may determine whether the previous context that is started is ended. When a predetermined reference time is expired from when the previous context is started, the dialogue manager may determine that the previous context is ended. When the reference is not expired, the dialogue manager may determine whether a context is changed by comparing information related to the previous context with information related to a current context.

In one embodiment, the dialogue manager determines whether the context is changed by comparing a previous domain and a keyword extracted from the previous context with a domain and a keyword extracted from the current context.

When it is determined that the context is not changed, the dialogue manager may provide a dialogue and service having a continuity with a previous dialogue and service performed in the previous context. When it is determined that the context is changed, the dialogue manager may end the previous context and start the current context as a new context.

In accordance with another aspect of the present disclosure, a dialogue processing method includes comparing a level of an input signal input via a microphone that is always opened with a reference level in real time. The dialogue processing method also includes determining that a user's speech is input when the level of the input signal is greater than the reference level. The dialogue processing method further includes performing a dialogue processing process by performing speech recognition on the input signal when it is determined that the user's speech is input.

In one embodiment, the reference level is determined based on a level of a background signal that is input in a state in which the user's speech is not uttered.

In one embodiment, the dialogue processing method further includes determining that the input signal is the background signal when the level of the input signal is equal to or less than the reference level and includes updating the stored level of the background signal using the level of the input signal.

In one embodiment, the performance of the dialogue processing process includes determining whether a previous context that is started is present based on information related to a pre-stored previous context.

In one embodiment, the performance of the dialogue processing process includes determining, when the previous context that is started is present, whether the previous context that is started is ended.

In one embodiment, the determination of whether the previous context that is started is ended includes determining that the previous context is ended when a predetermined reference time is expired from when the previous context is started.

In one embodiment, the performance of the dialogue processing process includes determining whether a context is changed by comparing information related to the previous context with information related to a current context, when a predetermined reference time is not expired.

In one embodiment, the determination of whether a context is changed includes determining whether the context is changed by comparing a previous domain and a keyword extracted from the previous context with a domain and a keyword extracted from the current context.

In one embodiment, the performance of the dialogue processing process includes providing a dialogue and service having a continuity with a previous dialogue and service performed in the previous context when it is determined that the context is not changed.

In one embodiment, the performance of the dialogue processing process includes terminating the previous context and starting the current context as a new context when it is determined that the context is changed.

BRIEF DESCRIPTION OF THE DRAWINGS

These and/or other aspects of the present disclosure will become apparent and more readily appreciated from the following detailed description of embodiments, taken in conjunction with the accompanying drawings of which.

DETAILED DESCRIPTION

Figure 1:
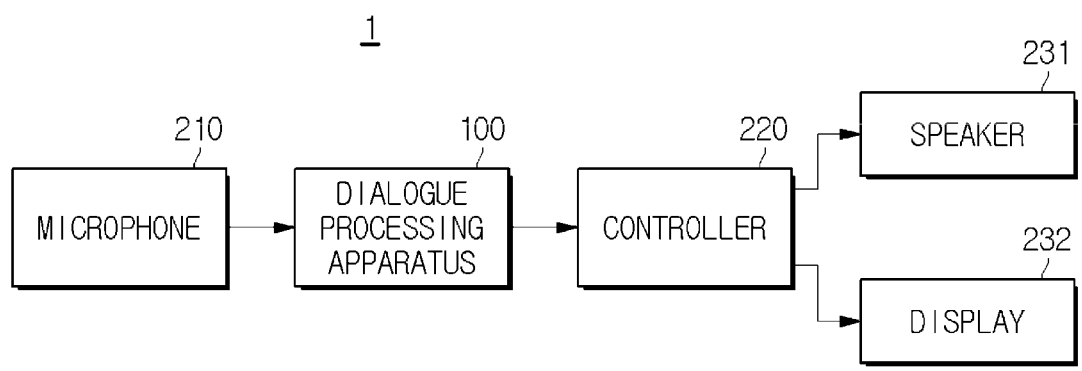
FIG. 1 is a control block diagram illustrating a relationship between a dialogue processing apparatus and components of a vehicle in accordance with an embodiment of the present disclosure.

The reliability and convenience of operating a vehicle may be improved by integrating speech recognition technology into a vehicle. This allows the user to control a variety of functions of the vehicle by simply speaking without operating an input device.

In the following description, like reference numerals refer to like elements throughout the specification. Well-known functions or constructions are not described in detail since they would obscure the one or more embodiments with unnecessary detail. Terms such as "unit", "module", "member", and "block" may be embodied as hardware or software. According to the embodiments, a plurality of "unit", "module", "member", and "block" may be implemented as a single component or a single "unit", "module", "member", and "block" may include a plurality of components.

It will be understood that when an element is referred to as being "connected" to another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

It will be understood that, although terms such as first, second, third, etc., may be used herein to describe and differentiate various elements, such a naming convention is not intended to denote or set an order thereof and the disclosure should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each step may be implemented in an order different from the illustrated order unless the context clearly indicates otherwise.

Reference will now be made in detail to embodiments of the present disclosure, examples of which are illustrated in the accompanying drawings. In the drawings, the following symbols are used to identify various elements of the disclosed embodiments, wherein:
 i. 100 represents a dialogue processing apparatus;
 ii. 110 represents a monitor,
 iii. 120 represents a speech recognizer,
 iv. 130 represents a natural language processor;
 v. 140 represents a speech manager or dialogue manager;
 vi. 1 represents a vehicle;
 vii. 210 represents a microphone;
 viii. 220 represents a controller
 ix. 231 represents a speaker;
 x. 232 represents a display; and
 xi. 260 represents a communicator.

According to an embodiment, a dialogue processing apparatus may be configured to recognize a user's intention by recognizing a user's speech (i.e., utterance or verbal communication of words) and provide a service appropriate for the user intention. The dialogue processing apparatus may also output a speech by a means configured to provide the service or to clearly recognize the intention of the user. Since a gateway connecting a dialogue processing apparatus 100 to a user corresponds to a vehicle, the dialogue processing apparatus 100 may be provided in the vehicle or an external server of the vehicle. Thus, the dialogue processing apparatus 100 may be configured to send and receive data through a communication with the vehicle.

FIG. 1 is a control block diagram illustrating a relationship between a dialogue processing apparatus and components of a vehicle in accordance with an embodiment of the present disclosure.

Referring to FIG. 1, when a user utters a speech, or speaks, into a microphone 210, the microphone 210 may convert the speech into an electrical signal and transmit the electrical signal to the dialogue processing apparatus 100.

In this embodiment, the dialogue processing apparatus 100 may recognize the speech of the user and analyze the recognized speech to recognize the intention of the user. For example, the intention of the user may include certain destination search and route guidance, information search, calling, text messaging, audio or video control, and other controls related to the vehicle.

In this embodiment, the dialogue processing apparatus 100 may be an apparatus configured to provide a service corresponding to the intention of the user. The dialogue processing apparatus 100 may also be configured to output a speech. For example, when the intention of the user is to receive route guidance to a certain destination, the dialogue processing apparatus 100 may output a speech to check the destination or output a speech to provide additional information related to the corresponding destination.

When the dialogue processing apparatus 100 transmits a control signal or a command word configured to output a speech to a controller 220, the controller 220 may output the corresponding speech through a speaker 231.

In addition, the dialogue processing apparatus 100 may output visual information through a screen as another means for providing a service corresponding to the intention of the user. When the dialogue processing apparatus 100 transmits the control signal or the command word to output visual information to the controller 220, the controller 220 may output the information in a visual manner, such as through a display 232. For example, a script of the speech output through the speaker 231 may be displayed on the display 232.

When the intention of the user is to receive route guidance to a certain destination, the controller 220 may transmit the control signal to a navigation module 240 so that the navigation module 240 guides the user along a route according to the intention of the user.

Figure 2:
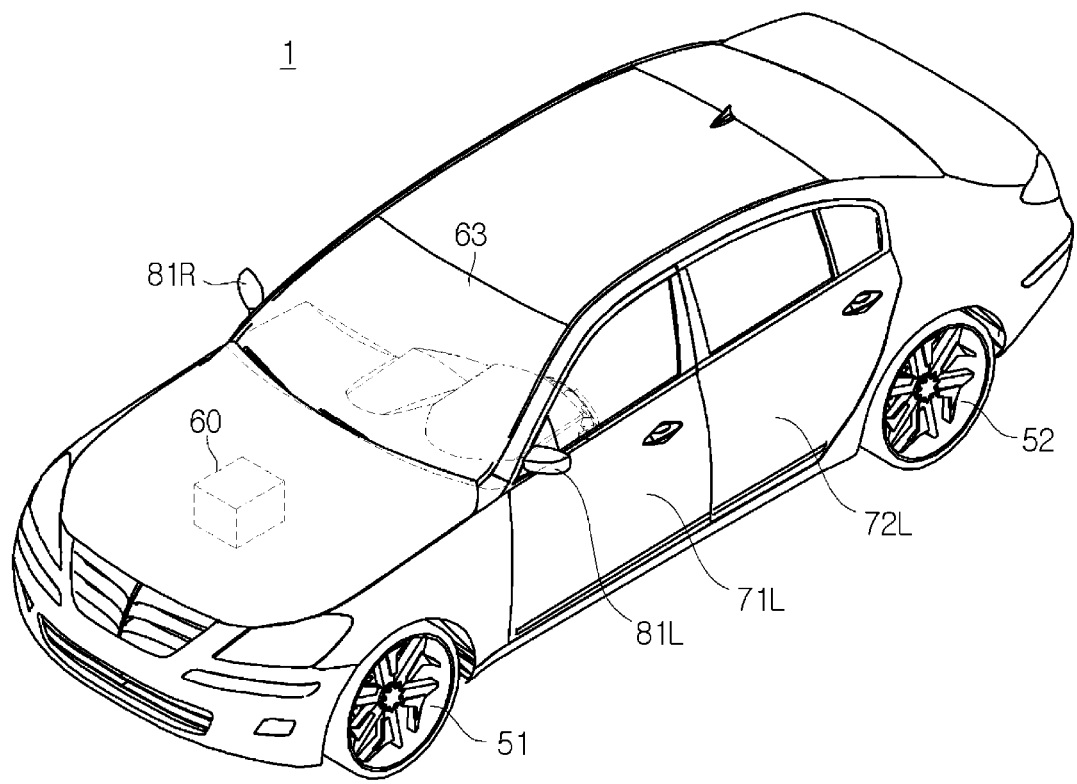
FIG. 2 is an exterior view of the vehicle in accordance with an embodiment of the present disclosure.

In the control block diagram of FIG. 1, the microphone 210, the controller 220, the speaker 231, and the display 232 may be a component provided in the vehicle 1 (refer to FIG. 2). The dialogue processing apparatus 100 may be provided in the vehicle 1 as described above or alternatively provided outside the vehicle 1.

Figure 3:
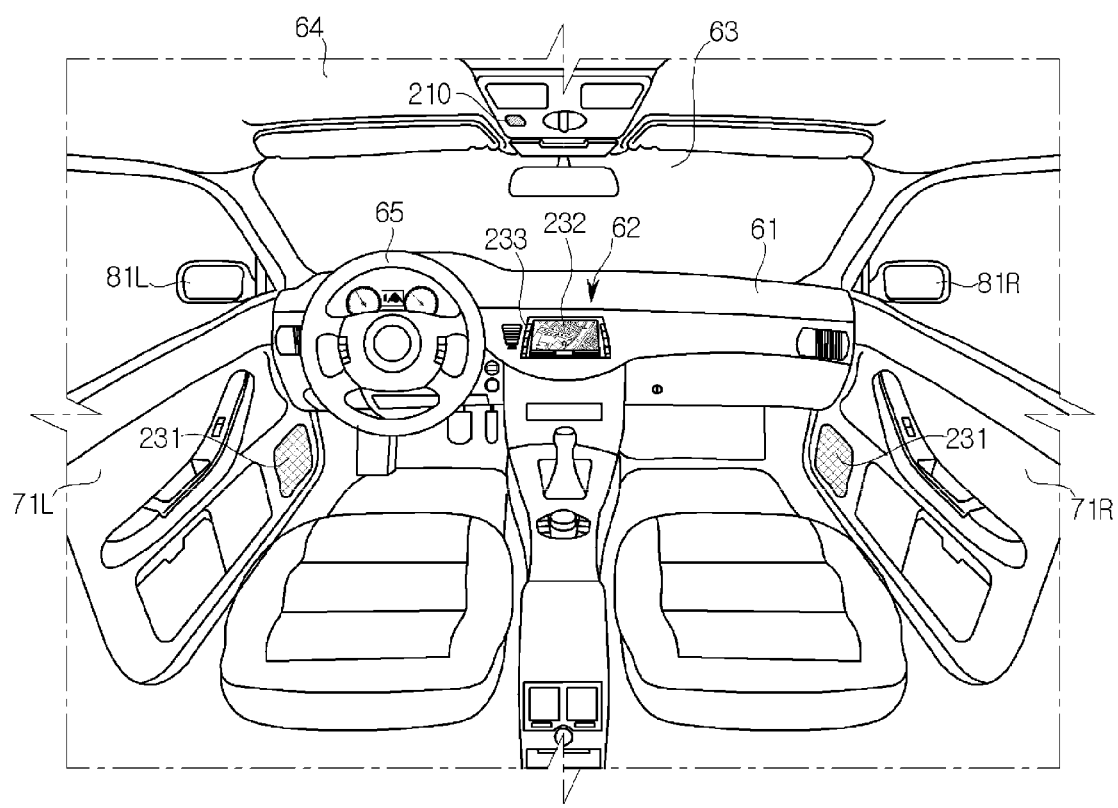
FIG. 3 is a view of a configuration of the inside of the vehicle in accordance with an embodiment of the present disclosure.

FIG. 2 is an exterior view of the vehicle in accordance with an embodiment of the present disclosure. FIG. 3 is a view of a configuration of the inside of the vehicle in accordance with an embodiment of the present disclosure.

Referring to FIGS. 2 and 3, the vehicle 1 may include vehicle wheels 51 and 52 moving the vehicle 1, doors 71L, 71R, 72L, and 72R closing the inside of the vehicle 1 from the outside, a front glass 63 providing a front view of the vehicle 1 to a driver inside the vehicle 1, and side mirrors 81L and 81R providing views of the rear sides of the vehicle 1 to the driver.

In an embodiment, the front glass 63 may be provided on an upper portion of the front of the vehicle 1 to allow the driver inside the vehicle 1 to acquire visual information forward of the vehicle 1 and may be referred to as "windshield glass".

The side mirrors 81L and 81R may include a left side mirror 81L provided on the left side of the vehicle 1 and a right side mirror 81R provided on the right side of the vehicle 1. The side mirrors 81L and 81R may allow the driver inside the vehicle 1 to acquire visual information of the side and the rear of the vehicle 1.

The vehicle wheels 51 and 52 may include a front wheel 51 provided on the front of the vehicle and a rear wheel 52 provided on the rear of the vehicle. A driving device 60 provided inside of the vehicle 1 may supply a torque to the front wheel 51 and the rear wheel 52 so that the vehicle 1 may be moved forward and backward.

When the vehicle 1 uses a front wheel drive system, the driving device 60 may supply the torque to the front wheel 51 and when vehicle 1 uses a rear wheel drive system, the driving device 60 may supply the torque to the rear wheel 52. In addition, when vehicle 1 uses a four-wheel drive system, the driving device 60 may supply the torque to both the front wheel 51 and the rear wheel 52.

The driving device 60 may employ an engine configured to generate a torque by burning fossil fuel or a motor configured to generate a torque by receiving power source from a capacitor. Alternatively, the driving device 60 may employ a hybrid method configured to have both of the engine and the motor and selectively use the engine, the motor, or the engine and the motor.

The doors 71L, 71R, 72L and 72R may be rotatably provided on the left side and the right side of the vehicle 1. When the door is opened, a driver may be allowed to be seated in the vehicle 1. When the door is closed, the inside of the vehicle 1 may be closed from the outside.

In addition, the vehicle 1 may include a detector, e. g. a proximity sensor, configured to detect an obstacle or another vehicle near the rear or lateral side of the vehicle 1. The vehicle 1 may also include a rain sensor configured to detect whether rain is present and an amount of rain.

In an embodiment, the display 232 may be provided in a center portion of a dashboard 61 inside the vehicle 1. The display 232 is configured to display a screen required for the control of the vehicle, and may include an audio function, a video function, a navigation function, and a calling function. An input 233, is configured to receive a user's control command and may also be provided in the center portion of the dashboard 61 inside of the vehicle 1, i.e., a center fascia 62.

The display 232 may be implemented by any one of various display devices, e.g., LCD (Liquid Crystal Display), LED (Light Emitting Diode), PDP (Plasma Display Panel), OLED (Organic Light Emitting Diode), and CRT (Cathode Ray Tube).

A user may input a command to control the vehicle 1 by operating the input 233. The input 233 may be provided in a hard key type on an area adjacent to the display 232, as illustrated in FIG. 3. Alternatively, when the display 232 is implemented by a touch screen, the display 232 may perform a function of the input 233.

The vehicle 1 may also receive a user control command as speech via the microphone 210. The microphone 210 may receive the sound of the speech and then covert the sound into an electrical signal.

For effective speech input, the microphone 210 may be mounted to a head lining 64, as illustrated in FIG. 3, but an embodiment of the vehicle 1 is not limited thereto. Therefore, the microphone 210 may be mounted to the dashboard 61 or a steering wheel 65. In addition, the microphone 210 may be mounted to any position as long as the position is appropriate for receiving the user's speech.

In the inside of the vehicle 1, one or more speakers 231, which may be configured to output a sound required to provide the service desired by the user, may be provided. For example, speakers 231 may be provided inside of the driver's seat door 71L and the passenger-seat door 71R.

In an embodiment, the speaker 231 may output a speech for navigation route guidance, a sound or a speech included in audio/video contents, a speech for providing information or service desired by the user, or a speech generated as a response to the users speech or utterance.

Figure 4:
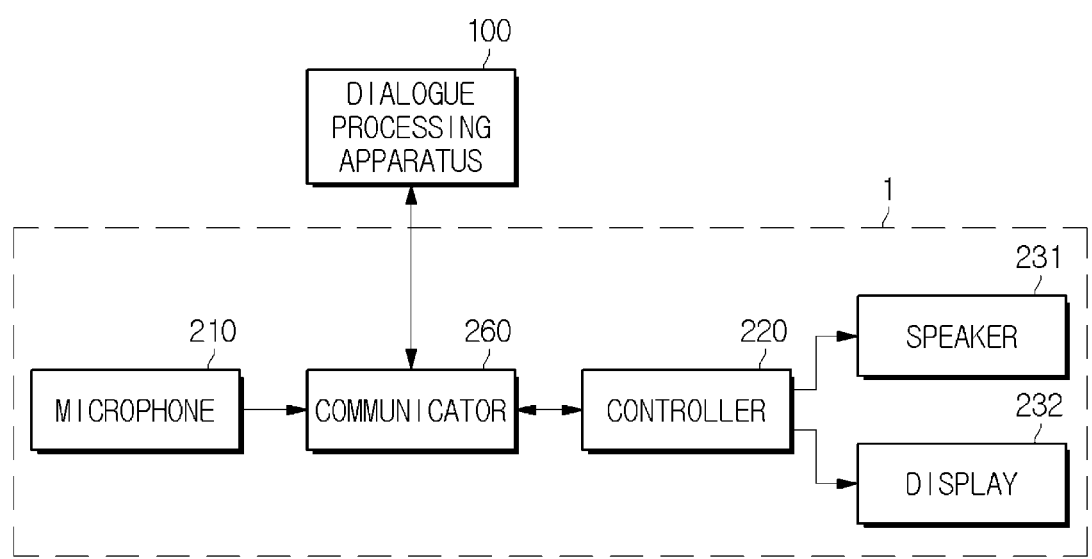
FIG. 4 is a control block diagram illustrating an embodiment in which the dialogue processing apparatus is configured separately from the vehicle.

FIG. 4 is a control block diagram illustrating an embodiment in which the dialogue processing apparatus 100 is configured separately from the vehicle 1.

For example, the dialogue processing apparatus 100 may be provided in an external server or in a user's mobile device. A mobile device may include an electronic device such as a Personal Digital Assistant (PDA), a laptop, a tablet PC, a smart phone, or a wearable device (e.g., a smart glass or a smart watch). However, examples of the mobile device are not limited thereto and thus any electronic device capable of storing data while securing mobility and capable of transmitting data by being connected to the vehicle 1 via a wired and/or wireless communication may be used as the mobile device.

In an embodiment, the vehicle 1 may include a communicator 260 configured to communicate with an external server or a mobile device having the dialogue processing apparatus 100.

The communicator 260 may include at least one communication module configured to communicate with an external device. For example, the communicator 260 may include at least one of a short range communication module, a wired communication module, and a wireless communication module.

The short range communication module may include a variety of short range communication modules and is configured to transmit and receive a signal using a wireless communication module in the short range (e.g., Bluetooth module, Infrared communication module, Radio Frequency Identification (RFID) communication module, Wireless Local Access Network (WLAN) communication module, NFC communications module, and ZigBee communication module).

The wired communication module may include a variety of wired communication modules (e.g., Local Area Network (LAN) module, Wide Area Network (WAN) module, or Value Added Network (VAN) module) and a variety of cable communication modules (e.g., Universal Serial Bus (USB), High Definition Multimedia Interface (HDMI), Digital Visual Interface (DVI), recommended standard 232 (RS-232), power line communication or plain old telephone service (POTS)).

The wireless communication module may include a wireless communication module supporting a variety of wireless communication methods (e.g., Wifi module, Wireless broadband module, global System for Mobile (GSM) Communication, Code Division Multiple Access (CDMA), Wideband Code Division Multiple Access (WCDMA), Time Division Multiple Access (TDMA), and Long Term Evolution (LTE)).

The wireless communication module may include an antenna, a transmitter and a receiver to transmit and receive a signal.

The wireless communication module may further include a signal conversion module configured to modulate a digital control signal into a radio signal in the analog form and configured to demodulate the radio signal in the analog form, which is received, into a digital control signal.

In addition, in an embodiment, the communicator 260 may further include an internal communication module for communication between electronic devices in the vehicle 1. The communication protocol of the vehicle 1 may use Controller Area Network (CAN), Local Interconnection Network (LIN), FlexRay, the Ethernet, or any combination thereof.

The communication unit 260 may transmit and receive data to and from the external server via the wireless communication module. The communication unit 260 may transmit and receive data to and from the mobile device via the short range communication module or the wired communication module.

Therefore, when the dialogue processing apparatus 100 is provided in the external server, the vehicle 1 may transmit and receive data to and from the dialogue processing apparatus 100 via the wireless communication module. When the dialogue processing apparatus 100 is provided in the mobile device, the vehicle 1 may transmit and receive data to and from the dialogue processing apparatus 100 via the short range communication module or the wired communication module.

Alternatively, some components of the dialogue processing apparatus 100 may be included in the vehicle 1 and other components of the dialogue processing apparatus 100 may be included in the external server or the mobile device. Determining which components are included in the vehicle 1 and which components are included in the external server or the mobile device may be performed according to a data storage capacity occupied by each component or the performance of the processor required for each component.

Figure 5:
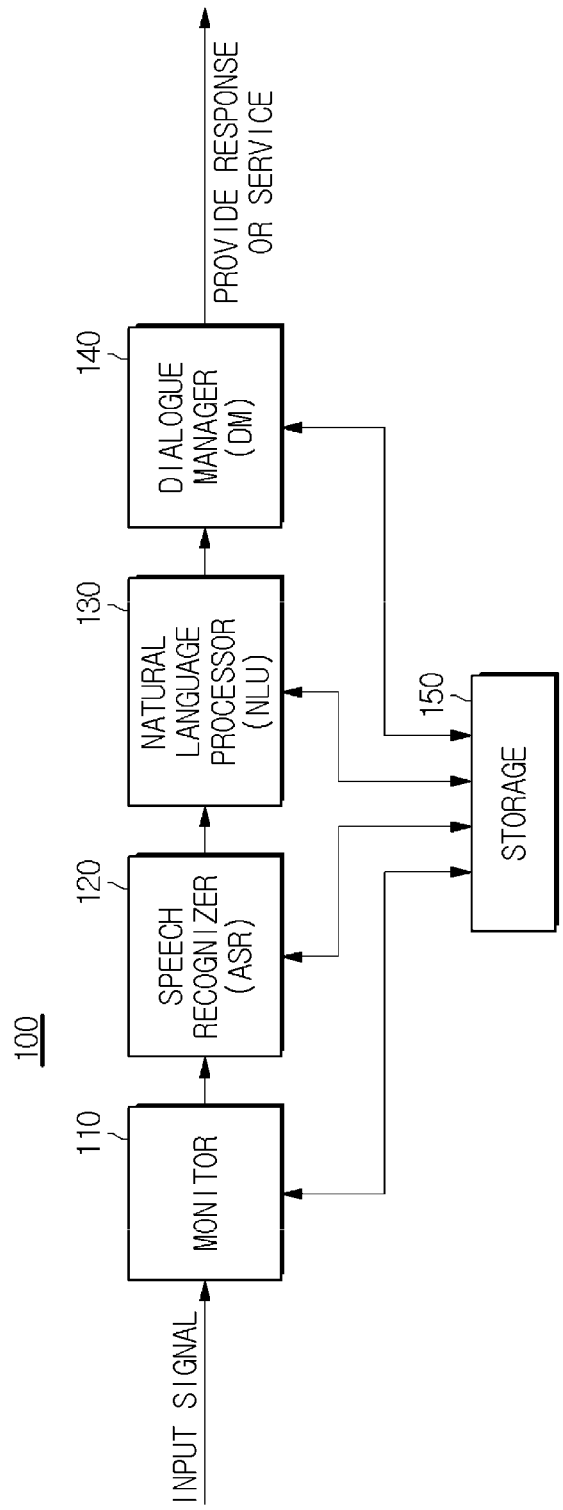
FIG. 5 is a control block diagram illustrating the dialogue processing apparatus in accordance with an embodiment.

FIG. 5 is a control block diagram illustrating the dialogue processing apparatus in accordance with an embodiment.

Referring to FIG. 5, according to an embodiment, the dialogue processing apparatus 100 may include a monitor 110 configured to determine whether a user's speech is input by monitoring an input signal transmitted from the microphone 210. The dialogue processing apparatus may also include a speech recognizer 120 configured to output an utterance in the form of text by recognizing the input user's speech. The dialogue processing apparatus may also include a natural language processor 130 configured to recognize a user's intention by applying a natural language understanding technique. The dialogue processing apparatus may also include a dialogue manager 140 configured to manage a dialogue to provide a response or a service according to the user's intention. The dialogue processing apparatus may also include a storage device 150 configured to store a variety of information necessary for the input signal monitoring, the speech recognition, natural language processing, and dialogue management.

Conventionally, a user needs to open a microphone by operating a push to talk (PTT) button in order to input a speech or a user needs to input a trigger signal, e.g., speaking a separate command, to activate the speech recognition. However, according to an embodiment, as for the dialogue processing apparatus 100, the microphone 210 may always be opened and the monitor 110 may determine whether a user's speech is input by monitoring a signal input via the microphone 210 in real time. When the monitor 110 determines that the user's speech is input, the input speech signal may be input to the speech recognizer 120 and then a process for the dialog process may be started. Operation of the monitor is described in more detail below.

In an embodiment, the monitor 110, the speech recognizer 120, the natural language processor 130, and the speech manager 140 may respectively include a memory configured to store programs to perform the above mentioned operation and operation described below, and a processor configured to execute the stored programs.

In another embodiment, the monitor 110, the speech recognizer 120, the natural language processor 130, and the speech manager 140 may respectively include a separate memory and processor or share a memory and a process with each other.

In addition, the memory and processor may also be used in plural and, in this case, the plurality of the memory and the processor may be integrated on a single chip or provided in a physically separate position.

Hereinafter, a description of an operation of each component included in the dialogue processing apparatus 100 is described in detail with reference to FIG. 6.

Figure 6:
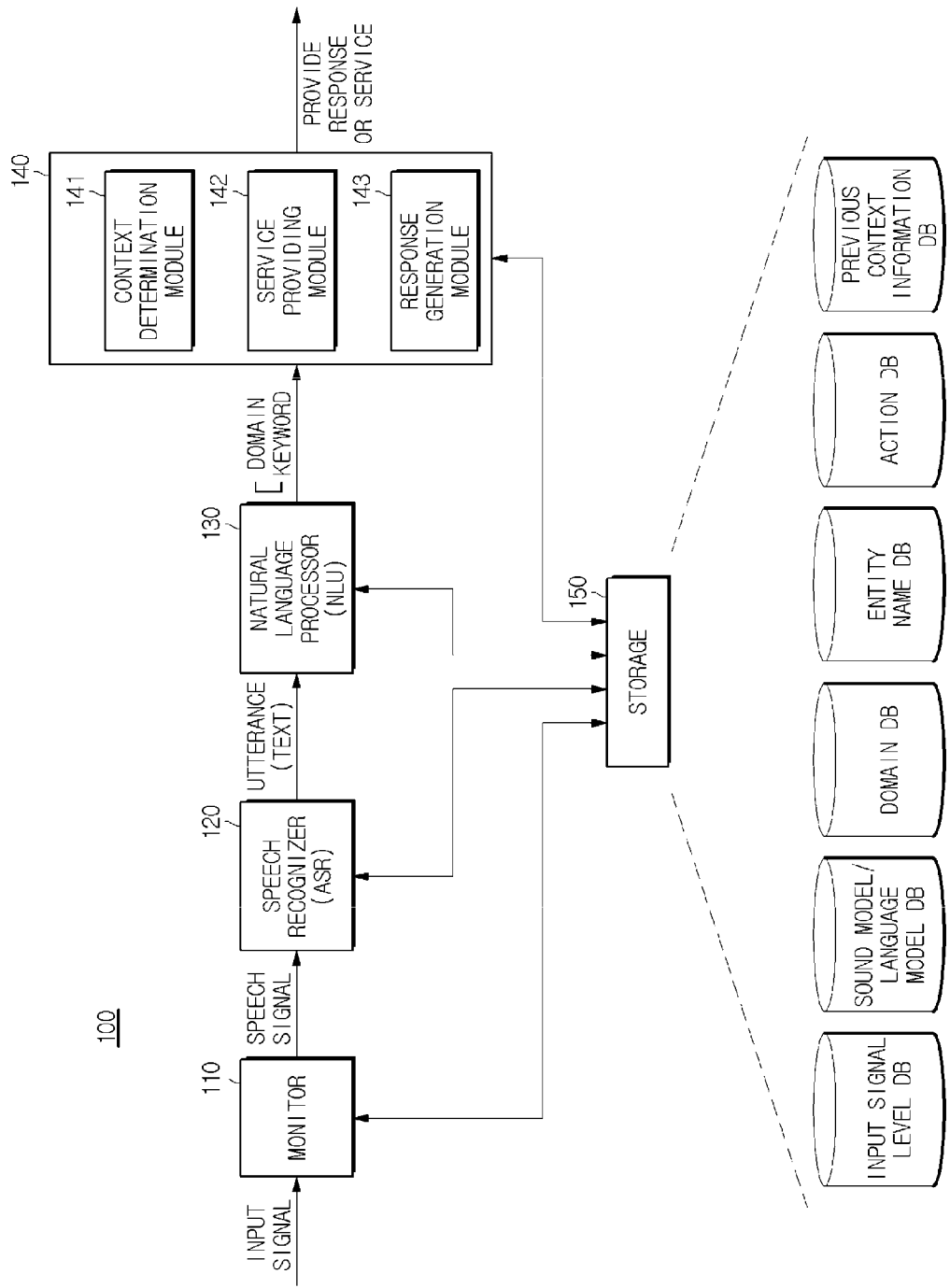
FIG. 6 is a control block diagram illustrating components of the dialogue processing apparatus in accordance with an embodiment of the present disclosure.

FIG. 6 is a control block diagram illustrating components of the dialogue processing apparatus 100 in accordance with an embodiment of the present disclosure.

Referring to FIG. 6, the monitor 110 may monitor an input signal transmitted from the microphone 210 in real time. Particularly, the monitor 110 may determine whether the intensity of the input signal, i.e., the level of the input signal, is greater than a reference level. When the level of the input signal is greater than the reference level, the monitor 110 may determine that a user's speech is input.

In this embodiment, the reference level may be determined by a background signal that is input in a state in which a user's speech is not uttered. Particularly, the reference level may be determined such that the level of the background signal, which is generated as the vehicle 1 stops or drives, is databased (input signal level DB) and stored in the storage device 150. The reference level is determined based on the level of the background signal stored in the input signal level DB.

For example, the background signal level may be stored as an average value, and a level higher than the average value of the background signal level may be set as the reference level. For example, a level, which is 10 dB higher than the background signal level, may be set as the reference level.

The background signal level stored in the input signal level DB may be updated in real time to improve its accuracy and reliability. To this end, when the level of the input signal is equal to or less than the reference level, it may be determined that the input signal is the background signal. Thus, it may be possible to update the level of the background signal using the stored level of the input signal.

In an embodiment, the speech recognizer 120 may recognize a speech that is uttered by a user from the input speech signal and output the recognition result. The recognition result output from the speech recognizer 120 may be an utterance in the form of text.

The speech recognizer 120 may also include a speech recognition engine. The speech recognition engine may recognize a speech uttered by a user by applying a speech recognition algorithm to the input speech and generate a recognition result.

Since the input speech is converted into a more useful form for the speech recognition, the speech recognizer 120 may detect an actual speech section included in the speech by detecting a start point and an end point from the speech signal. This is called End Point Detection (EPD).

In an embodiment, the speech recognizer 120 may extract the feature vector of the input speech from the detected section by applying the feature vector extraction technique, e.g., Cepstrum, Linear Predictive Coefficient (LPC), Mel Frequency Cepstral Coefficient (MFCC) or Filter Bank Energy.

The speech recognizer 120 may acquire the results of recognition by comparing the extracted feature vector with a trained reference pattern. The speech recognizer 120 may use an acoustic model, or sound model, for modeling and comparing the signal features of a speech, and a language model for modeling a linguistic order relation of a word or a syllable corresponding to a recognition vocabulary. For this, the storage device 150 may store the acoustic model and language model DB.

The acoustic model may be classified into a direct comparison method of setting a recognition target to a feature vector model, and comparing the feature vector model to a feature vector of a speech signal. The acoustic model may also be classified into a statistical method of statistically processing a feature vector of a recognition target.

The direct comparison method is setting a unit, such as a word or a phoneme, which is a recognition target, to a feature vector model and comparing a received speech to the feature vector model to determine similarity between them. A representative example of the direct comparison method is vector quantization. Vector quantization is mapping feature vectors of a received speech signal to a codebook that is a reference model to code the results of the mapping to representative values, and comparing the representative values to each other.

The statistical model method is configuring units of a recognition target as state sequences and using a relationship between the state sequences. Each state sequence may be configured with a plurality of nodes. The method of using the relationship between the state sequences can be classified into Dynamic Time Warping (DTW), Hidden Markov Model (HMM), and a method of using a neural network.

The DTW is a method of compensating for differences in the time axis through comparison to a reference model in consideration of the dynamic feature of speech, such as that the length of a signal varies over time even when a person utters a pronunciation. The HMM method is a recognition method of assuming a speech as a Markov process having state transition probability and observation probability of nodes (output symbols) in each state. The HMM method then estimates state transition probability and observation probability of nodes based on learning data, and calculates probability at which a received speech will be generated from an estimated model.

Meanwhile, the language model of modeling a linguistic order relation of a word, a syllable, etc. can reduce acoustic ambiguity and recognition errors by applying an order relation between units configuring a language to units acquired through speech recognition. The language model may include a statistical language model and a model based on Finite State Automata (FSA). The statistical language model uses chain probability of a word, such as Unigram, Bigram, and Trigram.

In an embodiment, the speech recognizer 120 may use any one of the above-described methods for the speech recognition. For example, the speech recognizer 120 may use an acoustic model applying the HMM method, or an N-best search method in which an acoustic model is combined with a speech model. The N-best search method can improve recognition performance by selecting N recognition result candidates or less using an acoustic model and a language model, and then re-estimating an order of the recognition result candidates.

The speech recognizer 120 may calculate a confidence value to ensure reliability of a recognition result. A confidence value may be criteria representing the reliability of a speech recognition result. For example, the confidence value may be defined, with respect to a phoneme or a word being a recognized result, as a relative value of probability at which the corresponding phoneme or word has been uttered from different phonemes or words. Accordingly, a confidence value may be expressed as a value between 0 and 1 or between 1 and 100.

When the confidence value is greater than a predetermined threshold value, the speech recognizer 120 may output the recognition result to allow an operation corresponding to the recognition result to be performed. When the confidence value is equal to or less than the threshold value, the speech recognizer 120 may reject the recognition result.

The utterance in the form of text, which is the recognition result of the speech recognizer 120, may be input to the natural language processor 130.

In an embodiment, the natural language processor 130 may recognize an intention of user's utterance included in an utterance language by applying the natural language understanding technique. Therefore, the user may input a control command through a natural dialogue and the dialogue processing apparatus 100 may induce the input of the control command and provide a service required by the user via the dialogue.

The natural language processor 130 may perform morphological analysis on the utterance in the form of text. A morpheme is the smallest unit of meaning and represents the smallest semantic element that can no longer be subdivided. Thus, the morphological analysis is a first step in natural language understanding and transforms the input string into the morpheme string.

The natural language processor 130 may extract a domain from the utterance based on the morphological analysis result. The domain may be used to identify a subject of a user utterance language, or a variety of subjects, e.g., route guidance, weather search, traffic search, schedule management, fuel management and air conditioning control. The subject or subjects identified by the domain may be data-based (domain DB) and then stored in the storage device 150. In addition, information related to rules for inferring domains from the utterance may also be stored together in the domain DB.

The natural language processor 130 may recognize an entity name from the utterance. The entity name may be a proper noun (e.g., people names, place names, organization names, time, date, or currency) and the entity name recognition may be configured to identify an entity name in a sentence and determine the type of entity name identified. The natural language processor 130 may extract important keywords from the sentence using the entity name recognition and recognize the meaning of the sentence. The natural language processor 130 may use the entity name DB stored in the storage device 150 for the entity name recognition.

The natural language processor 130 may analyze a speech act included in the utterance. The speech act analysis may be configured to recognize the intention of the user utterance, e.g., whether a user asks a question, whether a user makes a request, or whether a user simply expresses an emotion.

The natural language processor 130 may extract an action corresponding to the intention of the user's utterance. The natural language processor 130 may recognize the intention of the user's utterance based on the information (e.g., domain, entity name, and speech act) and extract an action corresponding to the utterance. The natural language processor 130 may use the action DB stored in the storage device 150 to extract the action. The type of action that can be performed and the inference rule for each action may be stored in the action DB.

The processing result of the natural language processor 130 may be transmitted to the speech manager 140. For example, a domain and a keyword corresponding to the utterance may be transmitted to the speech manager 140. The morphological analysis result, the entity name, the action information, and the speech act information may be also transmitted to the speech manager 140.

In an embodiment, the speech manager 140 may include a context determination module 141 configured to determine a current context based on the processing result of the natural language processor 130. The speech manager 140 may also include a service providing module 142 configured to generate a control signal to provide a service corresponding to the intention of the user's utterance. The speech manager 140 may also include a response generation module 143 configured to generate a response to continue a dialogue with the user.

In an embodiment, the context determination module 141 may determine whether a context is already started or not, based on the previous context DB stored in the storage device 150. "Context" may represent a situation in which a certain action is performed through a dialogue between a user and the dialogue processing apparatus 100, or a situation in which a dialogue is performed for the performance of the action.

When the context is not started yet, the context determination module 141 may start a current context as a new context based on the processing result transmitted from the natural language processor 130. That is, the context determination module 141 may perform a dialogue and provide a service corresponding to the new context.

Information related to the current context may be stored in the previous context DB and when a user's speech is input again, the information may be used to determine whether a context is already started or not. The information related to the current context may include a start time, a domain, and a keyword. The start time may represent a point of time when a user's speech is input or a point of time when the context determination module 141 starts determining a context.

When a previous context is already started, the context determination module 141 may determine whether the previous context is ended or not. For example, when a predetermined reference time is expired from when the previous context is started, the context determination module 141 may determine that the corresponding context is ended.

When the reference time is not expired, the context determination module 141 may determine whether the context is changed or not by comparing information related to the previous context with information related to the current context. For example, the context determination module 141 may compare the domain and the keywords about the previous context to the domain and the keywords about the current context. When the domain about the previous context does not coincide with the domain about the current context, the context determination module 141 may determine that the context is changed. Although the domain about the previous context may coincide with the domain about the current context, when the association between the keywords is not present, the context determination module 141 may determine that the context is changed.

When the context is determined to be changed, the context determination module 141 may determine that the previous context is ended and then start the current context as a new context.

When the association between the domain and the keyword of the previous context and the domain and the keyword of the current context is recognized, the context determination module 141 may determine that the previous context is maintained, and allow a continuous dialogue and service to be provided based on the previous context DB. For this, dialogue content and action information about each context may be stored in the previous context DB and used for a subsequent process.

In an embodiment, the service providing module 142 and the response generation module 143 may provide an appropriate service and generate a response, respectively, corresponding to the intention of the user's utterance and the current context, based on the context determination result of the context determination module 141.

For example, when the intention of the user's utterance is providing a certain service, the service providing module 142 may output a control signal to provide the corresponding service. Referring again to FIG. 1, the control signal output from the service providing module 142 may be transmitted to the controller 220 of the vehicle 1 and the controller 220 may provide a service desired by the user by performing an appropriate control according to the transmitted control signal.

In an embodiment, the response generation module 143 may generate a response to check the intention of the user's utterance or to continue the dialogue according to the intention of the user's utterance. The response may be generated in the form of speech or text. When the response is generated in the form of speech, the response generation module 143 may synthesize the speech using a Text to Speech (TTS) technique and output the synthesized speech via the speaker 231.

When the service desired by the user is provided, the response generation module 143 may generate a response and output the response when a response is required.

Hereinafter an embodiment of a dialogue processing method is described according to an aspect of the present disclosure. The embodiment of the dialogue processing method may be applied to the dialogue processing apparatus 100 or the vehicle 1. Thus, the description of the dialogue processing apparatus 100 or the vehicle 1 with reference to FIGS. 1 to 6 may be applied to the embodiment of the dialogue processing method in the same manner.

Figure 7:
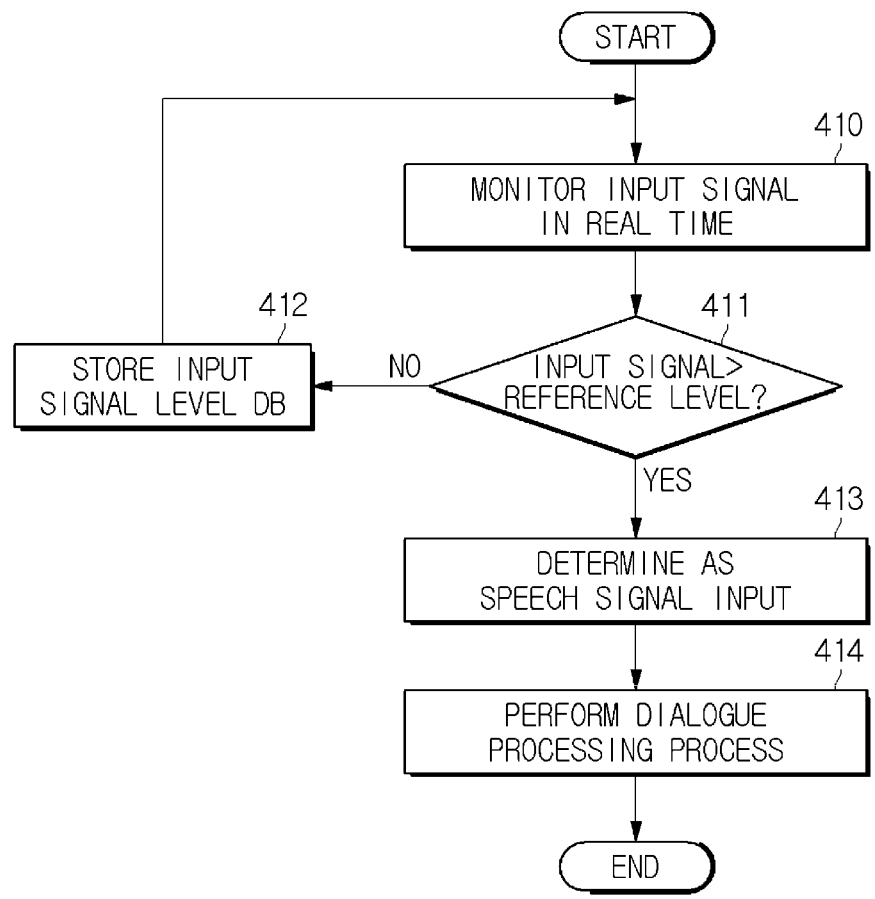
FIG. 7 is a flow chart illustrating a dialogue processing method in accordance with an embodiment.

FIG. 7 is a flow chart illustrating a dialogue processing method in accordance with an embodiment. However, since it is not required that all steps illustrated in the flow chart are included in the dialogue processing method, some of the steps may be required for merely describing the dialogue processing method. Thus, some of the steps may be excluded from the dialogue processing method.

Referring to FIG. 7, in an embodiment, the monitor 110 may monitor an input signal in real time (410). The microphone 210 may be always opened and the monitor 110 may monitor a signal input via the microphone 210 in real time to determine whether a user's speech is input or not.

In an embodiment, the monitor 110 may determine whether the level of the input signal is greater than a reference level (411). When the level of the input signal is greater than the reference level (yes in 411), the monitor 110 may determine that a user's speech is input (413). The reference level may be determined by a background signal that is input in a state in which a user's speech is not uttered. Particularly, the level of the background signal, which is generated when the vehicle 1 stops or drives, is databased (input signal level DB) and stored in the storage device 150. The reference level may be determined based on the level of the background signal stored in the input signal level DB.

When the level of the input signal is equal to or less than the reference level (no in 411), the level of the input signal may be stored in the input signal level DB. The background signal level stored in the input signal level DB may be updated in real time to improve its accuracy and reliability.

When it is determined that the user's speech is input, the input speech signal may be input to the speech recognizer 120 and the process for the dialogue processing may be started (414).

According to an embodiment of the present disclosure, it may be possible to activate the speech recognition by immediately starting the utterance having the content desired by the user, without opening the microphone by talk (PTT) button in order to input a speech or without inputting a trigger signal, e.g., speaking a separate command to activate the speech recognition.

Figure 8:
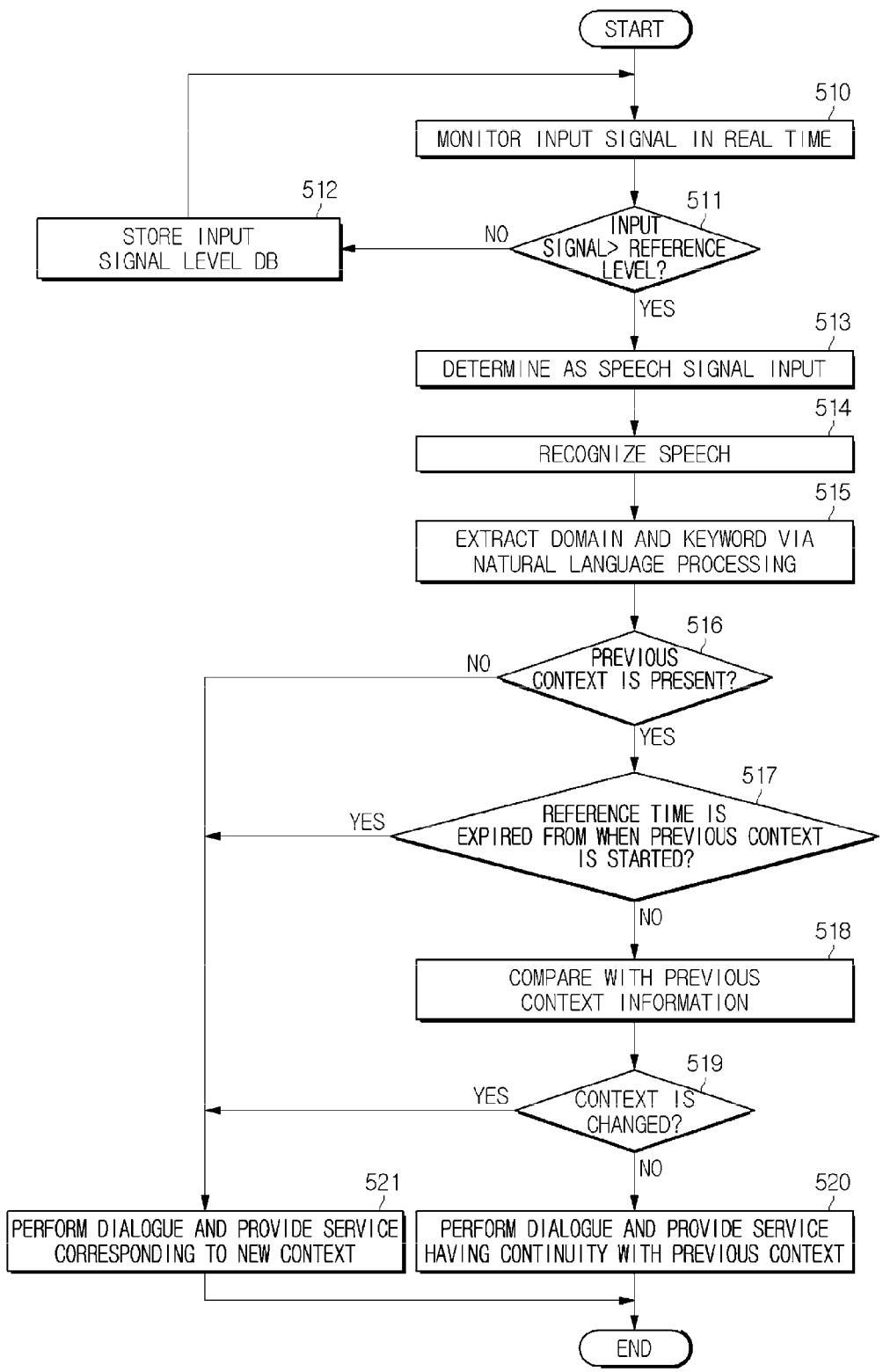
FIG. 8 is a flowchart illustrating a dialogue processing process in the dialogue processing method in accordance with an embodiment.

FIG. 8 is a flowchart illustrating a dialogue processing process in the dialogue processing method in accordance with an embodiment.

As mentioned above in FIG. 7, the monitor 110 may monitor an input signal in real time (510). The monitor 110 may determine whether the level of the input signal is greater than a reference level (511). When the level of the input signal is greater than the reference level (yes in 511), the monitor 110 may determine that a user's speech is input (513).

When the level of the input signal is equal to or less than the reference level (no in 511), the level of the input signal may be stored in the input signal level DB (512).

In an embodiment, when it is determined that the user's speech is input, the input signal (speech signal) may be transmitted to the speech recognizer 120. The speech recognizer 120 may recognize a speech uttered by the user, from the input speech signal (514), and output the recognition result. The recognition result output from the speech recognizer 120 may be an utterance in the form of text.

The recognition result output from the speech recognizer 120, i.e., an utterance in the form of text, may be input to the natural language processor 130. The natural language processor 130 may extract a domain and a keyword from the utterance through the natural language processing by applying the natural language understanding technique (515).

In an embodiment, the context determination module 141 may determine whether the previous context is present or not, based on the previous context DB stored in the storage device 150 (516). That is, the context determination module 141 may determine whether the previous context is started or not. "Context" may represent a situation in which a certain action is performed through a dialogue between a user and the dialogue processing apparatus 100, or a situation in which a dialogue is performed for the performance of the action.

When the previous context is not started (no in 516), the context determination module 141 may start a current context as a new context based on the processing result transmitted from the natural language processor 130. Therefore, the context determination module 141 may perform a dialogue and provide a service corresponding to the new context (521). Information related to the current context may be stored in the previous context DB and when a user's speech is input again, the information may be used to determine whether a context is already started or not. The information related to the current context may include a start time, a domain, and a keyword. The start time may represent a point of time when a user's speech is input or a point of time when the context determination module 141 starts determining a context.

When the previous context is already present (yes in 516), the context determination module 141 may determine whether the previous context is ended or not. For this, the context determination module 141 may determine whether a predetermined reference time is expired from when the previous context is started (517). When the predetermined reference time is expired (yes in 517), the context determination module 141 may determine that the corresponding context is ended, and perform a dialogue and provide a service corresponding to the new context (521).

When the predetermined reference time is not expired (no in 517), the context determination module 141 may determine whether the context is changed or not by comparing information related to the previous context with information related to the current context (518). For example, the context determination module 141 may compare the domain and the keywords about the previous context to the domain and the keywords about the current context. When the domain about the previous context does not coincide with the domain about the current context, the context determination module 141 may determine that the context is changed. Although the domain about the previous context may coincide with the domain about the current context, when the association between the keywords is not present, the context determination module 141 may determine that the context is changed.

When it is determined that the context is changed (yes in 519), the context determination module 141 may determine that the previous context is ended, and start the current context as a new context. That is, the context determination module 141 may perform a dialogue and provide a service corresponding to the new context (521).

When it is determined that the context is not changed (no in 519), the context determination module 141 may allow a continuous dialogue and service to be provided based on the previous context DB (520). For this, dialogue content and action information about each context may be stored in the previous context DB and then used for a subsequent process.

According to an embodiment, the dialogue processing apparatus may be able to start a new context or perform the dialogue and the service having the continuity with the previous context by starting, stopping and changing the context itself, without inputting a separate command for starting, stopping and changing the context.

Figure 9:
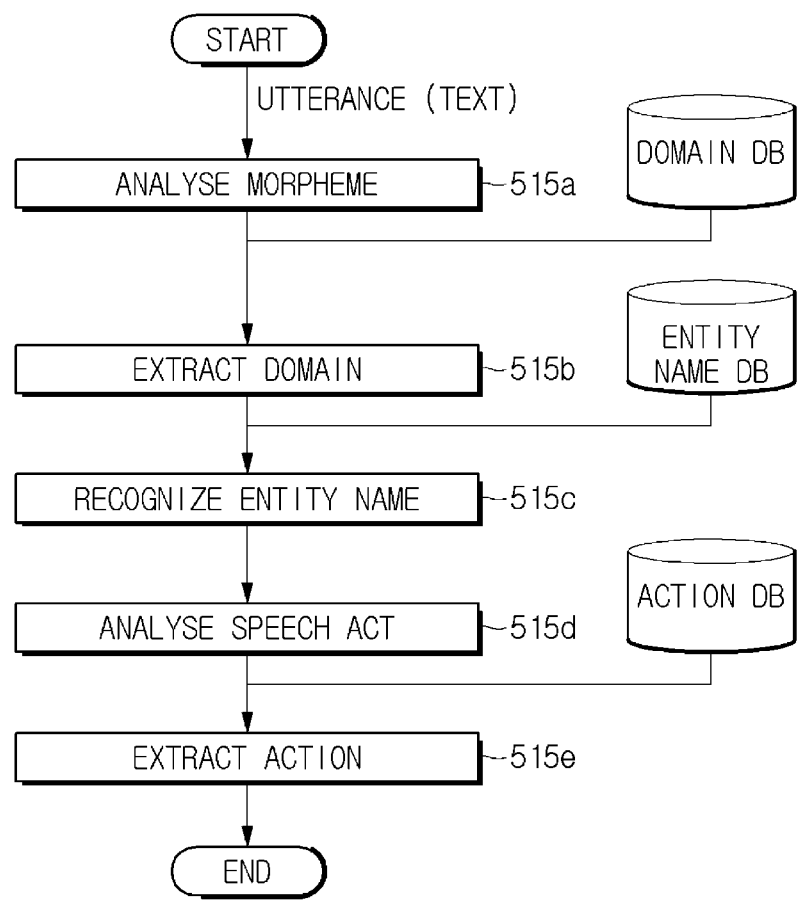
FIG. 9 is a flowchart illustrating a natural language processing in the dialogue processing method in accordance with an embodiment of the present disclosure.

FIG. 9 is a flowchart illustrating natural language processing in the dialogue processing method in accordance with an embodiment of the present disclosure.

As for performing the dialogue processing between a user and a device, the natural language processing may be important to recognize the intention of the user's utterance. In an embodiment, to process the natural language, the natural language processor 130 may perform the morphological analysis on an utterance in the form of text (515a) and extract a domain from the utterance based on the result of the morphological analysis (515b). The domain may be used to identify a subject of a user's utterance language, or a variety of subjects, e.g., route guidance, weather search, traffic search, schedule management, fuel management, and air conditioning control. The subject or subjects identified by the domain may be databased (domain DB) and then stored in the storage device 150 with the inference rule thereof.

In an embodiment, the natural language processor 130 may recognize an entity name from the utterance (515c). The natural language processor 130 may use the entity name DB stored in the storage device 150 for the entity name recognition.

The natural language processor 130 may analyze a speech act included in the utterance (515d). The speech act analysis may be configured to recognize the intention of the user utterance, e.g., whether a user asks a question, whether a user makes a request, or whether a user simply expresses an emotion.

The natural language processor 130 may recognize the intention of the user's utterance based on the information (e.g., domain, entity name, and speech act) and extract an action corresponding to the intention of the user's utterance (515e). The natural language processor 130 may use the action DB stored in the storage device 150 to extract the action. The type of action that can be performed and the inference rule for each action may be stored in the action DB.

The result of the morphological analysis, the domain, the entity name, the action information, and the speech act information corresponding to the utterance, i.e., the result of the natural language processing, may be transmitted to the speech manager 140. At least one of the domain, the entity name, the action information, and the speech act information may become a keyword. The keyword may be used to be compared with the previous context information.

As is apparent from the above description, according to the proposed dialogue processing apparatus, a vehicle having the proposed dialogue processing apparatus, and a dialogue processing method, it may be possible to allow a user to start the speech recognition by an utterance without performing an operation for an additional trigger. This may be accomplished by monitoring an intensity of an acoustic signal that is input in real time and determining that the speech recognition is started when the intensity of the input acoustic signal is equal to or greater than a reference value.

It may also be possible to provide a response and a service appropriate for a user's intention by determining whether a dialogue is continuously performed or whether a dialogue with a new subject is started, based on a domain and a keyword extracted from an input speech.

As is apparent from the above description, according to the proposed dialogue processing apparatus, a vehicle having the proposed dialogue processing apparatus, and a dialogue processing method, when a user inputs a destination, it may be possible to recognize a user's real intention by analyzing a user's behavior pattern. Databasing the user's real intention provides information appropriate for the user's real intention when the user inputs the same destination.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A dialogue processing apparatus coupled to a microphone configured to receive a natural language speech utterance and to convert the received natural language speech utterance into an electrical input signal, the dialogue processing apparatus comprising:
   a processor;
   a storage device configured to store the level of a background signal; and
   a non-transitory memory configured to store computer executable code, the non-transitory memory coupled to the processor to cause the processor to implement:
      a monitor to receive the electrical input signal and to compare a level of the electrical input signal with a reference level in real time and to determine that the natural language speech utterance of a user is input when the level of the electrical input signal is greater than the reference level;
      a speech recognizer to receive from the monitor, the electrical input signal and to output an utterance in the form of text by performing speech recognition on the electrical input signal, wherein the speech recognizer extracts a feature vector of the electrical input signal by applying a feature extraction technique and compares the extracted vector with a trained reference pattern;
      a natural language processor to extract a domain and a keyword based on the utterance regardless of whether the utterance includes a trigger word, when it is determined that the natural language speech utterance of the user is input; and
      a dialogue manager to determine whether a previous context is maintained based on the domain and the keyword,
   wherein the reference level is determined based on a level of the background signal that is input in a state in which the speech is not uttered,
   wherein the storage device determines that the electrical input signal is the background signal when the level of the electrical input signal is equal to or less than the reference level, and
   further wherein the storage device updates the stored level of the background signal using the level of the electrical input signal.

2. The dialogue processing apparatus of claim 1, wherein the dialogue manager determines whether a previous context that is started is present based on information related to a pre-stored previous context.

3. The dialogue processing apparatus of claim 2, wherein when the previous context that is started is present, the dialogue manager determines whether the previous context that is started is ended.

4. The dialogue processing apparatus of claim 3, wherein when a predetermined reference time is expired from when the previous context is started, the dialogue manager determines that the previous context is ended.

5. The dialogue processing apparatus of claim 4, wherein when the predetermined reference time is not expired, the dialogue manager determines whether a context is changed by comparing information related to the previous context with information related to a current context.

6. The dialogue processing apparatus of claim 5, wherein the dialogue manager determines whether the context is changed by comparing a domain and a keyword extracted from the previous context with a domain and a keyword extracted from the current context.

7. The dialogue processing apparatus of claim 5, wherein when it is determined that the context is not changed, the dialogue manager provides a dialogue and service having a continuity with a previous dialogue and service performed in the previous context.

8. The dialogue processing apparatus of claim 5, wherein, when it is determined that the context is changed, the dialogue manager ends the previous context and starts the current context as a new context.

9. A vehicle comprising:
   a microphone configured to receive a natural language speech utterance by being always opened and configured to convert the natural language speech utterance into an electrical input signal;
   a processor;
   a storage device configured to store the level of a background signal; and
   a non-transitory memory configured to store computer executable code, the non-transitory memory coupled to the processor to cause the processor to implement:
      a monitor to receive the electrical input signal and to compare a level of the electrical input signal with a reference level in real time and configured to determine that a natural language speech utterance of a user is input when the level of the electrical input signal is greater than the reference level;
      a speech recognizer to receive, from the monitor, the electrical input signal and to output an utterance in the form of text by performing speech recognition on the electrical input signal, wherein the speech recognition extracts a feature vector of the electrical input signal by applying a feature extraction technique and compares the extracted vector with a trained reference pattern;

a natural language processor to extract a domain and a keyword based on the utterance regardless of whether the utterance includes a trigger word, when it is determined that the natural language speech utterance of the user is input; and a dialogue manager configured to determine whether a previous context is maintained based on the domain and the keyword, wherein the reference level is determined based on a level of a background signal that is input in a state in which the natural language speech utterance is not uttered, wherein the storage device determines that the electrical input signal is the background signal when the level of the electrical input signal is equal to or less than the reference level, and further wherein the storage device updates the stored level of the background signal using the level of the electrical input signal.

10. The vehicle of claim 9, wherein
the dialogue manager determines whether a previous context that is started is present based on information related to a pre-stored previous context.

11. The vehicle of claim 10, wherein
when the previous context that is started is present, the dialogue manager determines whether the previous context that is started is ended.

12. The vehicle of claim 11, wherein
when a predetermined reference time is expired from when the previous context is started, the dialogue manager determines that the previous context is ended.

13. The vehicle of claim 12, wherein
when the predetermined reference time is not expired, the dialogue manager determines whether a context is changed by comparing information related to the previous context with information related to a current context.

14. The vehicle of claim 13, wherein
the dialogue manager determines whether the context is changed by comparing a domain and a keyword extracted from the previous context with a domain and a keyword extracted from the current context.

15. The vehicle of claim 13, wherein
when it is determined that the context is not changed, the dialogue manager provides a dialogue and service having a continuity with a previous dialogue and service performed in the previous context.

16. The vehicle of claim 13, wherein,
when it is determined that the context is changed, the dialogue manager ends the previous context and starts the current context as a new context.

17. A dialogue processing method comprising:
receiving a natural language speech utterance and converting the received natural language speech utterance into an electrical signal;
comparing a level of the electrical input signal input via a microphone that is always opened with a reference level in real time;
determining that the natural language speech utterance of a user is input when the level of the electrical input signal is greater than the reference level;
performing speech recognition on the electrical input signal and outputting an utterance in the form of text, wherein the speech recognition extracts a feature vector of the electrical input signal by applying a feature extraction technique and compares the extracted vector with a trained reference pattern; and
extracting a domain and a keyword based on the utterance regardless of whether the utterance includes a trigger word, when it is determined that the natural language speech utterance of the user is input,
wherein the reference level is determined based on a level of a background signal that is input in a state in which the natural language speech utterance is not uttered, and
further comprising:
determining that the electrical input signal is the background signal when the level of the input signal is equal to or less than the reference level; and
updating a stored level of the background signal using the level of the electrical input signal.

18. The dialogue processing method of claim 17, wherein
performing comprises determining whether a previous context that is started is present based on information related to a pre-stored previous context.

19. The dialogue processing method of claim 18, wherein
performing further comprises determining, when the previous context that is started is present, whether the previous context that is started is ended.

20. The dialogue processing method of claim 19, wherein
the determination of whether the previous context that is started is ended comprises determining that the previous context is ended when a predetermined reference time is expired from when the previous context is started.

21. The dialogue processing method of claim 20, wherein
performing further comprises determining, when the predetermined reference time is not expired, whether a context is changed by comparing information related to the previous context with information related to a current context.

22. The dialogue processing method of claim 21, wherein
the determination of whether a context is changed comprises comparing a domain and a keyword extracted from the previous context with a domain and a current keyword extracted from the current context.

23. The dialogue processing method of claim 21, wherein
performing further comprises providing, when it is determined that the previous context is not changed, a dialogue and service having a continuity with a previous dialogue and service performed in the previous context.

24. The dialogue processing method of claim 21, wherein
performing further comprises, when it is determined that the previous context is changed, terminating the previous context and starting the current context as a new context.

* * * * *